B. CLARK.
COMBINATION ROUNDING AND MOLDING MACHINE.
APPLICATION FILED JAN. 11, 1918.
1,275,530. Patented Aug. 13, 1918.
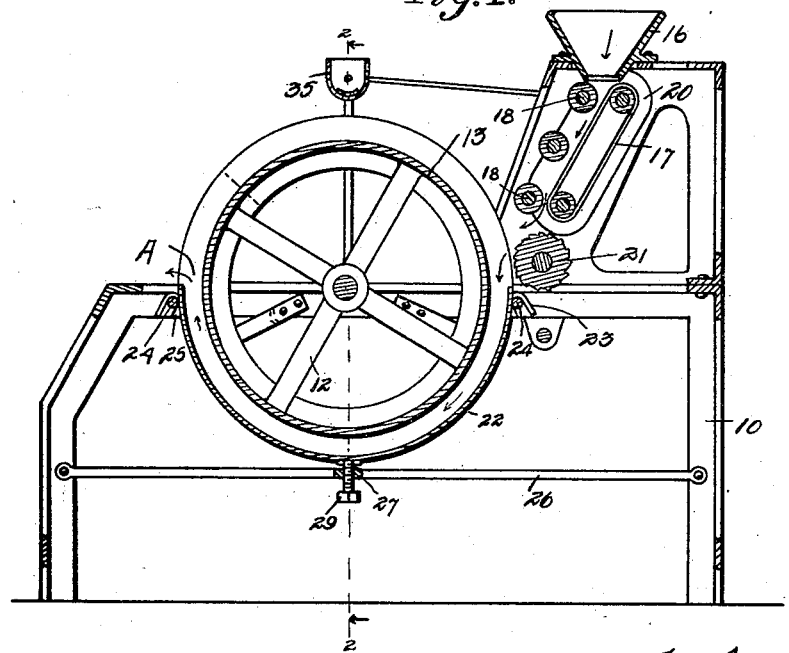
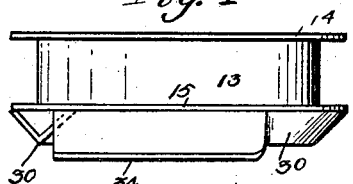
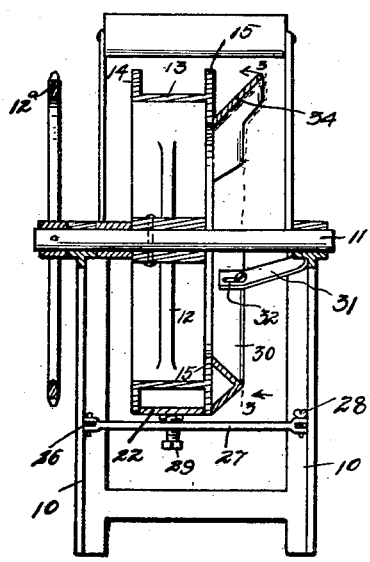
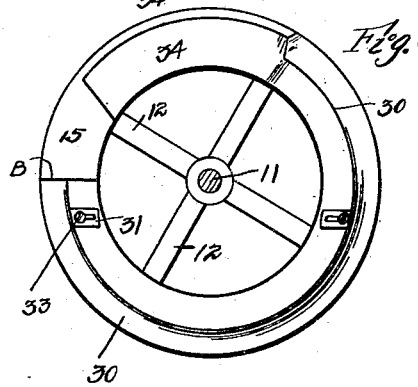
Inventor
Benjamin Clark

UNITED STATES PATENT OFFICE.

BENJAMIN CLARK, OF DES MOINES, IOWA.

COMBINATION ROUNDING AND MOLDING MACHINE.

1,275,530.

Specification of Letters Patent.

Patented Aug. 13, 1918.

Application filed January 11, 1918. Serial No. 211,435.

*To all whom it may concern:*

Be it known that I, BENJAMIN CLARK, a citizen of the United States, and resident of Des Moines, in the county of Polk and State of Iowa, have invented a certain new and useful Combination Rounding and Molding Machine, of which the following is a specification.

My invention relates to machines for shaping bread dough before panning.

The object of my invention is to provide a combined rounding and molding machine for bread dough.

More particularly it is my object to provide a machine of the class mentioned, having a rotary member, for instance, a wheel having a rim with spaced flanges, one of said flanges being adapted to serve as part of the molding device, and also as part of the rounding device.

Heretofore in the bakery art, it is my understanding that two machines have been used, one for rounding the bread and the other for molding it. I have made a combination machine adapted to round and mold the bread, certain parts of the machine performing parts of both operations.

Still a further object is to provide in such a machine a novel means for holding and controlling the drum casing forming part of the molding device.

With these and other objects in view my invention consists in the construction, arrangement and combination of the various parts of the device, whereby the objects contemplated are attained, as hereinafter more fully set forth, pointed out in my claims and illustrated in the accompanying drawings, in which:

Figure 1 shows a central, vertical, sectional view through a combination rounding and molding machine embodying my invention.

Fig. 2 shows a transverse, vertical, sectional view taken on the line 2—2 of Fig. 1.

Fig. 3 shows a side elevation partly in section of a portion of the machine; and Fig. 4 shows a top or plan view of a portion of the machine shown in Fig. 3.

In the accompanying drawings I have used the reference numeral 10 to indicate generally the frame of my improved machine which may be of any suitable material and construction.

Suitably mounted on the frame is a shaft 11, arranged transversely of the frame for rotation, and preferably having thereon a gearing device 12$^a$, whereby power may be transmitted to the shaft.

Mounted on the shaft 11 is a wheel 12 having a comparatively, broad flat rim 13, which is formed with outwardly extending flanges 14 and 15 adjacent to its edges. The flanges 15 also extend inwardly from the frame 13, as clearly shown in Fig. 2.

Rearwardly in the machine from the wheel 12 and spaced above the wheel 12 is a chute or the like 16. Below the chute is an endless conveyer 17 comprising a canvas belt or the like mounted on rollers and inclined from the chute downwardly and toward the wheel. Spaced forwardly from the conveyer 17 is a plurality of rollers 18, shown in Fig. 1. At the ends of the rollers 18 are casing members 20 so arranged as to hold material such as dough passing downwardly from the chute, from being moved sidewise off the conveyer. Below the lower end of the conveyer 17 is a corrugated roller 21, which serves to coil the dough.

Suitable mechanism not here shown and forming no part of my invention operates the conveyer 17, the rollers 18 and the roller 21.

Below the lower half of the rim 13 on the wheel 12 is a drum casing 22, forming part of the molding device and comprising a curved strip, shown in Figs. 1 and 2. The drum casing member 22 has at its ends yoke or hook members 23, clearly shown in Fig. 1, adapted to extend over the rods 24 for supporting the drum casing member. On each drum casing member adjacent to each hook member 23 is a wedge-shaped device 25, the use of which will be hereinafter referred to.

On the lower part of the machine are two longitudinally arranged, spaced frame members 26. Pivoted to one of the frame members 26 below the wheel 12 is a bar 27 designed to normally stand in position transversely of the machine and to be detachably secured to the other frame member 26 by means of a pin 28 or other suitable device.

Mounted in the member 27 is a screw bolt or the like 29.

In the practical installation of the drum casing member 22, the screw 29 is screwed downwardly and the member 27 is moved out of the way, thereupon the drum casing member 22 is inserted in position from below and moved upwardly until the hook members 23 clear the rods 24, whereupon the drum casing member is allowed to drop down until it is held in position by means of the hooks 23 on the rod 24. The member 27 is then moved to its position shown in Figs. 2 and 3. The screw bolt 29 is then screwed upwardly until it engages the bottom of the drum casing member 22, and the drum casing member is then forced upwardly thereby causing the wedges 25 to firmly engage the rods 24 for firmly locking the drum casing member in position.

In the practical use of the part of the machine heretofore described, the dough pieces are dropped through the chute 16 and therethrough downwardly over the conveyer 17 between said conveyer and the rollers 18 and thereby sheeted. These sheets are coiled by the roller 21 and dropped into the channel between the rim 13 and the drum casing member 22 following the course indicated by the arrow in Fig. 1. As the wheel 12 rotates the dough is molded and finally is discharged at the point "A" upon an endless conveyer or into pans or otherwise as may be desired.

Detachably mounted on the outside of the wheel 12 and adjacent to the flange 15 is a curved trough 30 V-shaped in cross section with the open end of the V adjacent to the flange 15, as illustrated in Figs. 2 and 4. This trough is connected with arms 31 on the frame, which are provided with elongated slots 32 by means of screw bolts 33, so that it may be pressed against the flange 15 and fastened by said screw bolts as may be desired.

The trough 30 is formed at the upper part of the wheel with a receiving hopper or the like 34, shown in Figs. 2, 3, and 4, terminating at "B" at the forward portion of the machine in such manner as to discharge the dough into a pan or upon an endless conveyer or the like.

In the practical use of the rounding device, the chunks of dough are dropped into the hopper 34 and when the wheel rotates the flange 15 causes the dough to be carried around through the trough 30 to be rounded until the dough is discharged in a ball at the point "B."

Above the wheel rim 13 and above the hopper 34 is a duster 35 of any suitable construction.

It will be seen that in my improved combination rounding and molding machine the flange 15 forms part of the molding mechanism and also forms part of the rounding device. It will also be obvious that the molding and rounding operations may be performed at the same time on my improved machine. I am thus enabled to perform the operation with a minimum employment of power. The power required to run my machine when used for both rounding and molding is much less than that required to operate separate molding and rounding machines.

If desired the dough may be placed in the hopper 34 and rounded and after removal from the rounding mechanism may be allowed to rest and recover for a short time and then dropped through the chute 16 and over the endless conveyer 17 to the molding mechanism.

In larger shops, however, both the rounding and molding mechanism will be used at the same time.

Numerous changes may be made in the construction and arrangement of the various parts of my improved rounding and molding machine without departing from the essential features and purposes of my invention, and it is my intention to cover by my claims any modified forms of structure or use of mechanical equivalents which may be reasonably included within their scope.

I claim as my invention:

1. A combination rounding and molding machine comprising a wheel having a substantially flat rim, formed with spaced outwardly extending flanges, a drum casing for closing the space between said flanges for a portion of the circumference of the wheel, said drum casing being fixed, means for feeding dough into the space between said casing and said rim, a V-shaped trough fixed adjacent to the outside of one of said flanges, with its open portion adjacent to the flange, said trough being curved and conforming to the shape of the wheel, means for feeding dough into one end of said trough, said trough terminating at its other end at a point spaced from said last means.

2. A combination rounding and molding machine, comprising a frame, a wheel mounted thereon having a rim with spaced, outwardly extending flanges, a drum casing member arranged adjacent to the lower portion of said wheel for forming a smooth passage for receiving bread for molding, a trough arranged adjacent to the outer surface of one of said flanges, said trough being curved to conform to the shape of the wheel and being angular in cross section, means adjacent to one end of said trough at the upper part of the wheel for feeding dough into said trough, said trough terminating at its other end short of said last described means, and means for adjustably mounting said trough on the frame.

BENJAMIN CLARK.

Copies of this patent may be obtained for five cents each, by addressing the "Commissioner of Patents. Washington, D. C."